United States Patent [19]

Verdun

[11] Patent Number: 5,715,411

[45] Date of Patent: Feb. 3, 1998

[54] APPARATUS AND METHOD OF CONVERTING SUBTRACTIVE DECODE DEVICE CYCLES TO POSITIVE PERIPHERAL COMPONENT INTERFACE DECODE DEVICE CYCLES

[75] Inventor: Gary J. Verdun, Belton, Tex.

[73] Assignee: Texas Instruments Incorporated, Dallas, Tex.

[21] Appl. No.: 587,164

[22] Filed: Jan. 16, 1996

[51] Int. Cl.$^6$ .............................. G06F 13/00; G06F 12/00
[52] U.S. Cl. .................. 395/309; 395/882; 395/287; 395/856
[58] Field of Search ............................ 395/309, 306, 395/308, 882, 287, 293, 856

[56] References Cited

U.S. PATENT DOCUMENTS

| | | | |
|---|---|---|---|
| 5,446,869 | 8/1995 | Padgett et al. | 395/500 |
| 5,517,650 | 5/1996 | Bland et al. | 395/306 |
| 5,522,050 | 5/1996 | Amini et al. | 395/306 |
| 5,568,621 | 10/1996 | Wooten | 395/292 |

*Primary Examiner*—Jack B. Harvey
*Assistant Examiner*—Ario Etienne
*Attorney, Agent, or Firm*—Bret J. Petersen; James Kesterson; Richard Donaldson

[57] ABSTRACT

An apparatus and method for converting a subtractive device decode cycle to a peripheral component interface device decode cycle comprising a data communications bus (45), an interface (110) to the data communications bus (45), a function decoder (125) and device decoder (12) coupled to the interface (110). The function decoder (125) and device decoder (120) detect the presence of predetermined command and device types, respectively, on the data communications bus (45). The function decoder (125) and device decoder (120) feed a device select drive circuit (135) when the proper address and command types are detected. Device addresses in preselected ranges are pass-through and maintained internally in order to prevent the subtractive decode agent (90) from grabbing the bus cycle. Also, a positive decode cycle detection circuit (130) is operably coupled to the device select drive circuit (135) to detect the presence of positive decode cycles after the subtractive decode device select signal has been asserted.

18 Claims, 7 Drawing Sheets

APPARATUS AND METHOD OF CONVERTING SUBTRACTIVE DECODE DEVICE CYCLES TO POSITIVE PERIPHERAL COMPONENT INTERFACE DECODE DEVICE CYCLES

TECHNICAL FIELD

The present invention relates in general to a method and device for converting system level device assertion cycles on a data communications bus and in particular to a device that converts subtractive decode agent cycles to positive decode agent cycles in a system using the peripheral component interface standard.

BACKGROUND OF THE INVENTION

Without limiting the scope of the invention, its background is described in connection with communications between a processor and peripheral device components using the peripheral component interface standard or other standardized bus architecture.

Standard bus architectures have been routinely employed as interfaces between the core microcomputer system or system processor and peripheral components such as floppy disk drives, CD drives, printers, sound boards, tape backup systems, pointing devices, internal subsystems and others devices. Popular examples of such bus architectures include the Industry Standard Architecture (ISA), the Extended Industry Standard Architecture (EISA), the PCMCIA, the Micro Channel, the NuBus and the Peripheral Component Interface ("PCI").

Of these, the PCI bus architecture is the latest development in the industry offering key technological and/or performance benefits over older standards. Compared to older architectures, PCI permits higher bus speeds (up to 33 Mhz), increased data transfer rates and independence from a particular processor or local bus arrangement. Thus, manufacturers have embraced the PCI bus and most offer one or more PCI based interfaces in their standard computer packages.

The implementation of a PCI based bus in modern day computer systems, however, poses several technical challenges. First, compatibility with existing core logic systems and standard components may require modifications to the system platform and/or configuration system. Second, the technical benefits of a newer standard may not be realized if overall system performance is hindered due to increased overhead caused by extra hardware, components and/or applications designed to integrate the new standard into existing systems.

SUMMARY OF THE INVENTION

It has been discovered that integrating a PCI-based data communications bus on a computer platform having internal devices compatible with older architectures has been a problem. Specifically, taking advantage of shortened device cycles defined by the PCI technical specification (version 2.0 or 2.1) has been difficult in a system having component with longer cycle times and slower performance overall. Thus, what is needed is an apparatus and method of integrating PCI-based technology in modern day computer platforms that supports the decreased cycle times and improved performance of the PCI technical specification.

Generally, and in one form of the invention, an apparatus for converting a subtractive device decode cycle in a PCI-based bus to a positive device decode cycle has been invented. A PCI bus has an interface for latching the address and command from the bus during a transaction. A function decoder and device decoder are coupled to the interface and are used to detect the presence of predetermined command and device types, respectively, on the bus. The function decoder and device decoder feed a device select drive circuit when the proper address and command types are detected which allows the subtractive decode agent in the computer system to grab or take the cycle. Device addresses in preselected ranges are passed-through and maintained internally so the subtractive decode agent grabs the bus cycle.

In another form of the invention, a positive decode cycle detection circuit is operably coupled to the device select drive circuit to detect the presence of positive decode cycles after the subtractive decode device select signal has been asserted.

An advantage of the invention is the ability to convert subtractive device decode cycles to PCI positive device decode cycles. In this regard, a control agent passes predetermined commands and address values to the system and generates device select signals to the PCI bus or the decode agent through use of a bidirectional buffer. The control agent can enable the DEVSEL# line on the PCI bus for subtractive device wishing to take the bus or enable the system subtractive decode agent by enabling its device select line to permit normal PCI cycle transactions.

For a more complete understanding of the present invention, including its features and advantages, reference is now made to the following detailed description, taken in conjunction with the accompanying drawings.

BRIEF DESCRIPTION OF THE DRAWINGS

In the drawings.

Corresponding numerals and symbols in the different figures refer to corresponding parts unless otherwise indicated.

DETAILED DESCRIPTION OF THE PREFERRED EMBODIMENT

Figure 1:
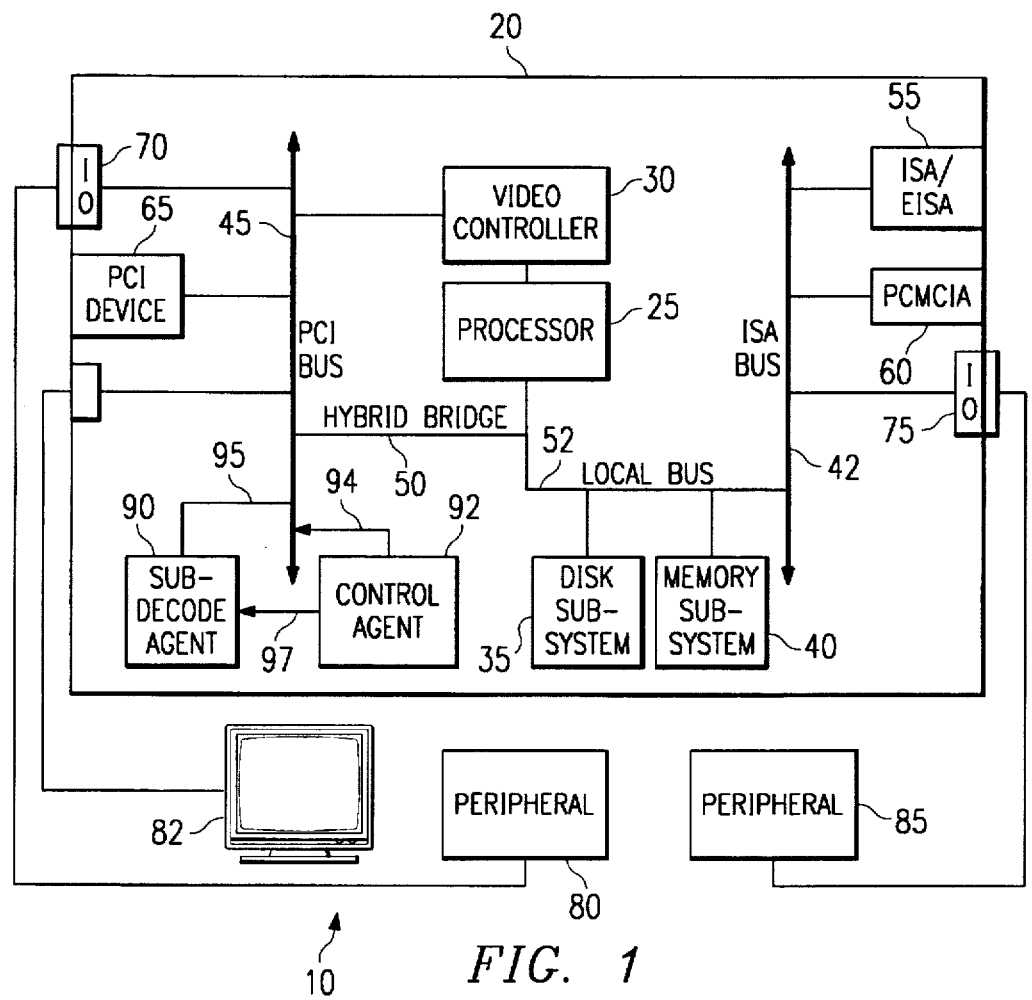
FIG. 1 shows a block diagram of a computer system with a subtractive decode agent in accordance with the preferred embodiment of the invention.

In reference to FIG. 1, a block diagram of a computer system using a subtractive decode agent is shown and denoted generally as 10. Computer system 10 includes the platform 20 that houses all the various devices for performing computing tasks and operations. The various devices can be internal to platform 20 or maintained externally as stand alone device. As shown, platform 20 includes internal components and devices including processor 25, video controller 30, memory subsystem 40, disk subsystem 35, ISA/EISA device 55, PCMCIA device 60, and PCI device 65. The external devices include peripherals 80 and 85 as well as video terminal 82.

Communications between the various components, subsystems and devices takes place along various signal pathways including ISA bus 42, PCI bus 45, local bus 52 and hybrid bridge 50. Hybrid bridge 50 is used as a link between processor 24 and PCI bus 45, thus allowing the processor to be independent of the attached PCI device 65. Disk subsystem 35 and memory subsystem 40 communicate with processor 25 via local bus 52. Also, PCMCIA device 60 ahd IS/EISA device 55 communicate on EISA bus 42, which in turn, is communicably linked to processor 25 via local bus 52.

As shown, peripherals 80 and 85 communicate with processor 25 via input/output ("I/O") 70 and I/O 75, respectively. In some embodiments, I/O 70 and I/O 75 are the physical connectors to platform 20 permitting peripherals 80 and 85 to be completely independent of the internal computer system 10 architecture. In other embodiments, I/O 70 and I/O 75 comprise a bridge, gateway or similar connection permitting the bidirectional flow of data to and from peripheral 80 and 85 and processor 25.

In operation, communications over PCI bus 45 occur between a master (such as processor 25) and target device (such as PCI device 65) as defined by the PCI technical specification 2.0 or 2.1. A FRAME# signal (line on PCI bus) is asserted and the address lines AD[31::0] drives the device address onto the PCI bus 45. Bus commands are used to specify the type of transaction on PCI bus 45 via command C/BE[3::0]# lines during the address phase of a PCI transaction. Table 1 illustrates the possible command types for given C/BE[3::0] values:

TABLE 1

| PCI bus command codes | |
|---|---|
| C/BE[3::0]# | Command Type |
| 0000 | Interrupt acknowledge |
| 0001 | Special cycle |
| 0010 | I/O read |
| 0011 | I/O write |
| 0100 | Reserved |
| 0101 | Reserved |
| 0110 | Memory read |
| 0111 | Memory write |
| 1000 | Reseryed |
| 1001 | Reserved |
| 1010 | Configuration read |
| 1011 | Configuration write |
| 1100 | Multiple memory read |
| 1101 | Dual-address cycle |
| 1110 | Memory-read line |

Data is transferred on PCI bus 45 during a data phase of the PCI transaction when a receive line IRDY# and device select line DEVSEL# are asserted. As an example, diagram 1 illustrates a possible transaction over PCI bus 45:

As shown in Diagram 1, DEVSEL# line may be asserted as a fast, medium or slow cycle depending on the particular device and transaction cycle. Fast, medium or slow decode cycles correspond to positive decode devices as defined by the PCI technical specification. Also shown are the non-positive decode devices which use subtractive device decode cycles on the DEVSEL# lines of the PCI bus 45. In this regard, the positive device decode cycles comprise a first decode type while the subtractive decode cycles comprise a second decode type. In some embodiments, non-PCI devices such as disk 35, memory 40, ISA/EISA device 55 and PCMCIA 60 can use a subtractive device decode cycle to assert the DEVSEL# line of the PCI bus 45.

Also in FIG. 1, subtractive decode agent 90 is shown coupled to PCI bus 45 via communication path 95. Subtractive decode agent 90 is responsible for detecting the presence of subtractive device assertion cycles on the PCI bus 45 in accordance with the PCI technical specification.

Control agent 92 is a critical element of the present invention and is controllably coupled to subtractive decode agent 90 via path 97 permitting control agent 92 to select subtractive decode agent's device select line (not shown). Control agent 92 is also controllably coupled to PCI bus 45 for monitoring bidirectional communications between processor 25 and other components or devices on the PCI bus 45. Control agent 92 can also assert the device select line DEVSEL# of PCI bus 45.

Thus, a device address and command can be taken off PCI bus 45 during an address phase and decoded by control agent 92 to determine whether the device is a positive decode device or subtractive decode device. Control agent 92 can assert the device select DEVSEL# line of either the subtractive decode agent 90 or the PCI bus 45 via a bidirectional buffer as herein described.

Figure 2:
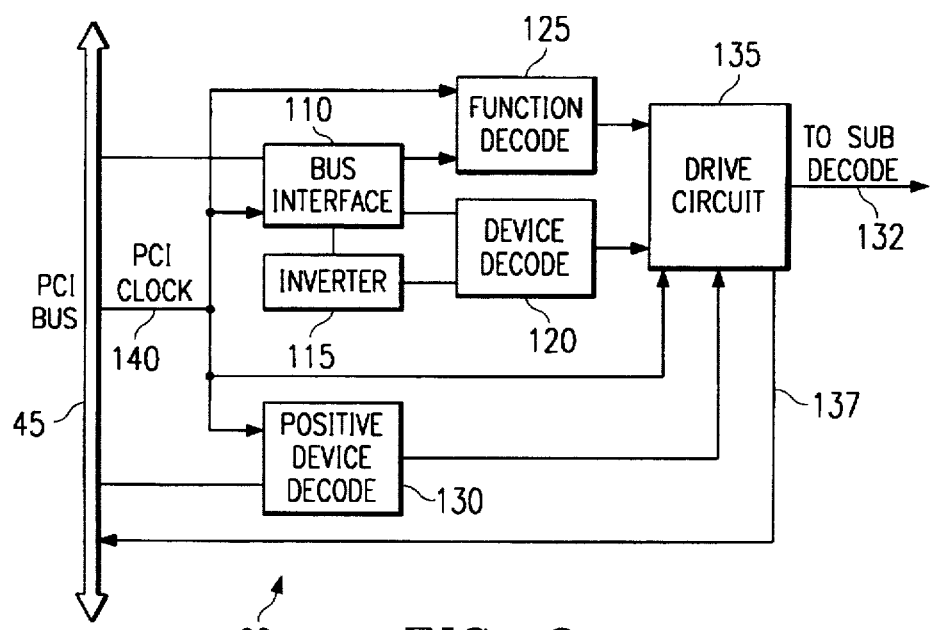
FIG. 2 shows a block diagram of the control agent in accordance with the preferred embodiment of the invention.

Turning to FIG. 2, a block diagram of the control agent 92 in accordance with the preferred embodiment of the invention is shown. PCI bus 45 provides the signal pathway for communications between the various devices of computer system 10. A bus interface 110 links the control agent 92 to the PCI bus 45 for obtaining device address, command and other transaction information off PCI bus 45.

A signal inverter 115 provides inverted address signals to device decoder 120. Device decoder 120 is communicably coupled to bus interface 110 and arranged to detect a plurality of predetermined device address values which in turn depend on the particular devices and configuration of computer system 10. In one embodiment, device decoder 120 detects the presence of predetermined address values corresponding to the internal components within computer system 10. Such components may use a subtractive device decode cycle for asserting the PCI bus. Thus, in normal operation subtractive decode device 90 would detect the presence of cycles asserted by such components.

In one form of the invention, device decode 120 latches the device address off PCI bus 45 during an address phase. Device decode 120 decodes the address and determines whether it belongs to a predetermined address value. If so, device decode "passes" the device address allowing the subtractive decode agent 90 to take the PCI bus 45 cycle. For example, table 2 shows ranges that may be detected as pass-through signals by device decoder 120:

TABLE 2

| Possible device pass-through values. | |
|---|---|
| Pass-through range | Description |
| 170–177 | Second HDD |
| 1F0–1F7 | First HDD |
| 278–27F | LPTC |
| 2F8–2FF | COM2 |
| 370–377 | FDD2 |
| 378–37F | LPTB |
| 3F0–3F7 | FDD1 |
| 3F8–3FF | COM1 |

Also shown is function decoder 125 which is communicably coupled to bus interface 110 for detecting command types along PCI bus 45. Function decoder 125 is arranged to detect predetermined command types such as read or write functions. In one embodiment, function decoder 125 is configured to detect only the presence of I/O reads and I/O writes prior in order to determine whether to pass the cycle to subtractive decode agent 90 or asserting the subtractive decode agent 90 device select signal with output 132.

A device select drive circuit 135 is also communicably coupled to device decode 120 and function decoder 125. In this way, device select signals DEVSEL# are asserted only when a predetermined command type and device address are received on PCI bus 140. Device select drive circuit 135 has output 137 to PCI bus 45 and output 132 to subtractive decode agent 90. In this way, device select drive circuit 135 can assert the DEVSEL# signal to the subtractive decode agent 90 when it detects the presence of an address value for subtractive decode devices not in the pass-through value range.

Alternatively, pass-though address values are handled by the subtractive decode agent 90 in due course. By asserting the device select signal cycles are prevented from being selected by the subtractive decode device 92 for devices not in the pass-through range or other predetermined address values or command types. The subtractive decode agent 90 will thus only be allowed to claim cycles of the predetermined address range and cycle type.

Also shown in FIG. 2 is positive device decode 130 coupled to PCI bus 45 and communicably linked to device select drive circuit 135. Positive device decode 130 is used to detect the presence of positive device decodes after a subtractive device cycle has been asserted. In this way, device select drive circuit 135 can drive the device select DEVSEL# the subtractive decode agent 90 active signaling the cycle has already been taken and allowing the positive decode devices to take cycles even though they fall into one of the predefined value ranges.

A PCI clock line 140 is coupled at one end to the PCI bus 45 and attached to bus interface 110, device select drive circuit 135 and positive device decode 130 to permit synchronized operation in conjunction with PCI bus transaction cycles.

Figure 3A:
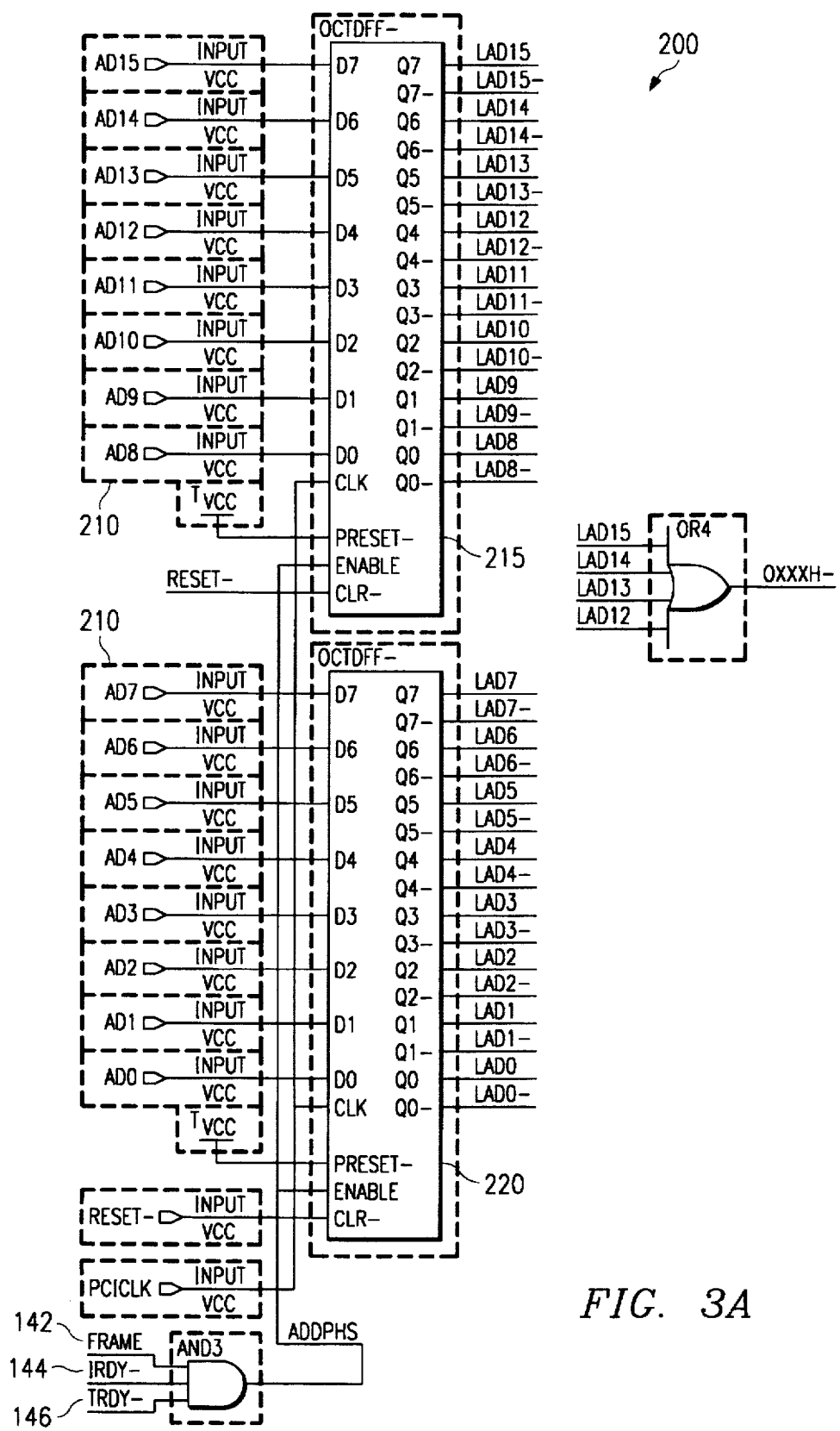
FIGS. 3a–3c are schematic diagrams of the bus interface and device decoder circuit in accordance with the preferred embodiment of the invention.
Figure 3B:
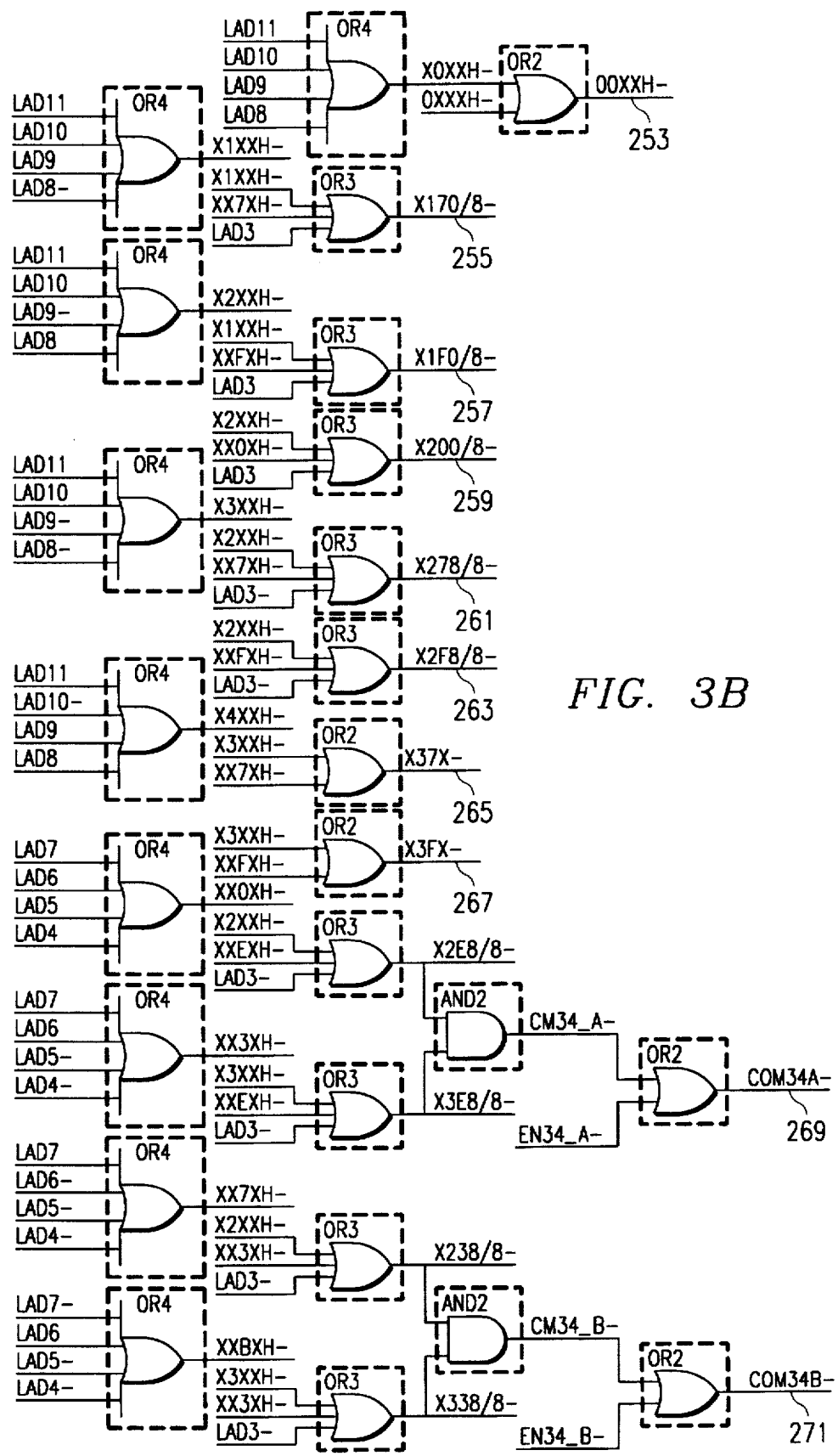
Figure 3C:
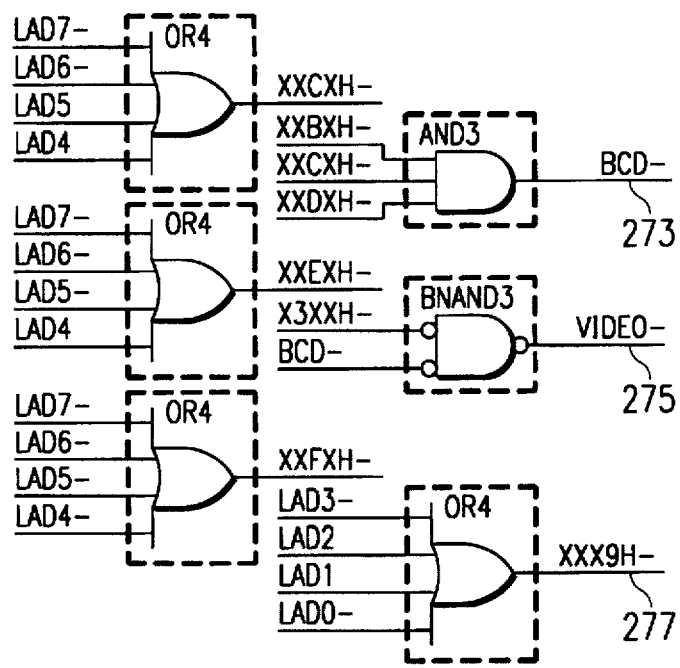
Figure 3C:
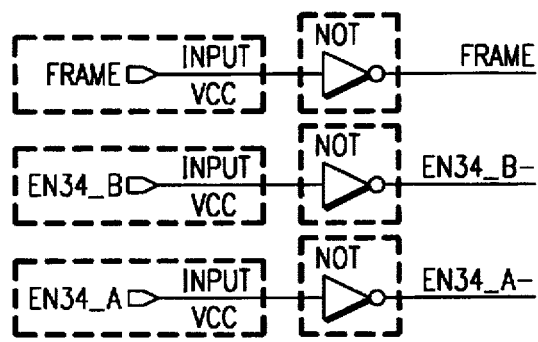

In reference to FIGS. 3a–3c, schematic diagrams of the bus interface and device decoder are shown and denoted generally as 200. Address lines 210 comprise individual data bits [AD0::AD15] of the device address and feed address decode latches 215 and 220. Latch registers 215 and 220 permit the device decoder 200 to determine the device address. Also, latch registers 215 and 220 can be used to store the current device address for future use by the system.

FRAME# input #142, IRDY- input 144 and TRDY- input 146 indicate the presence of a PCI address phase on the PCI bus 45 and are used by latch registers 215 and 220 to grab the address cycle during the PCI address phase. In the preferred embodiment, a 100' input indicates the presence of an address phase on the PCI bus 45 and enables latch registers 215 and 220. Also, latch registers 215 and 220 are synchronized to PCI clock line 140.

Latched address lines 227, 229, 231, 233, 235, 237, 239, 241, 243, 245, 249, 251 (LA0 through LA15 and LA0- through LA15-). As shown, latch registers 215 and 220 provide inverted address bits (LA0- through LA15-) for decoding purposes. Latched address lines 227, 229, 231, 233, 235, 237, 239, 241, 243, 245, 249, 251 are fed as inputs into gates to decode bit sequences corresponding to predetermined address values. In the preferred embodiment, the predetermined address values correspond to a plurality of pass-through values for known subtractive decode device cycles.

Any predetermined device address values present appear at outputs 253, 255, 257, 259, 261, 263, 265, 267, 269, 271, 273, 275 and 277. It should be understood that more or less values may be employed depending on the particular range values and system configuration. Where a predetermined address is present, the cycle is allowed to proceed normally by passing the PCI device select DEVSEL# to the subtractive decode agent 90 device select DEVSEL#.

Figure 4:
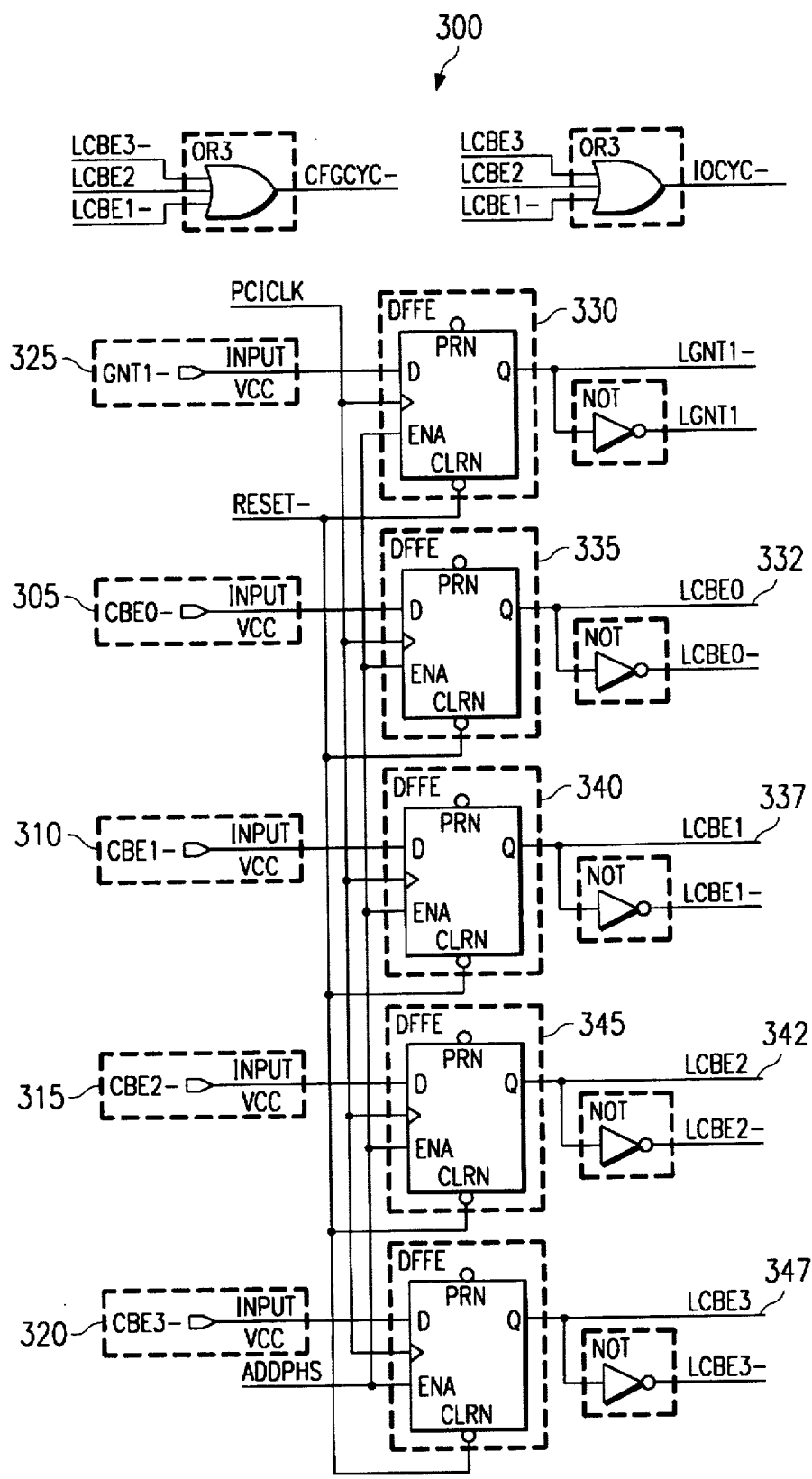
FIG. 4 is a schematic diagram of the function decoder circuit in accordance with the preferred embodiment of the invention.

In reference to FIG. 4, a circuit diagram of the function decoder is shown and denoted generally as 300. Function decoder has command bit inputs 305, 310, 315 and 320 from which the command type can be decoded. Inputs 305, 310, 315 and 320 are obtained directly from the PCI bus 45 and are latched to the function decoder via flip flops 330, 335, 340 and 345, respectively. Flip flops 330, 335, 340 and 345 are also used to store the current command type for future use by the system.

Also shown is grant line 325 which determines whether the device is the master or target of the current transaction. Thus, the status of the grant line 325 controls the direction of data flow along the PCI bus 45. In this way, the control agent 100 can determine the master/target identity of the device it is controlling.

Latched command/byte enable 332, 337, 342 and 347 [LCB0 through LCB3] bits provide the status of the byte enables during the last address phase and identify the type of command cycle currently being run.

Figure 5:
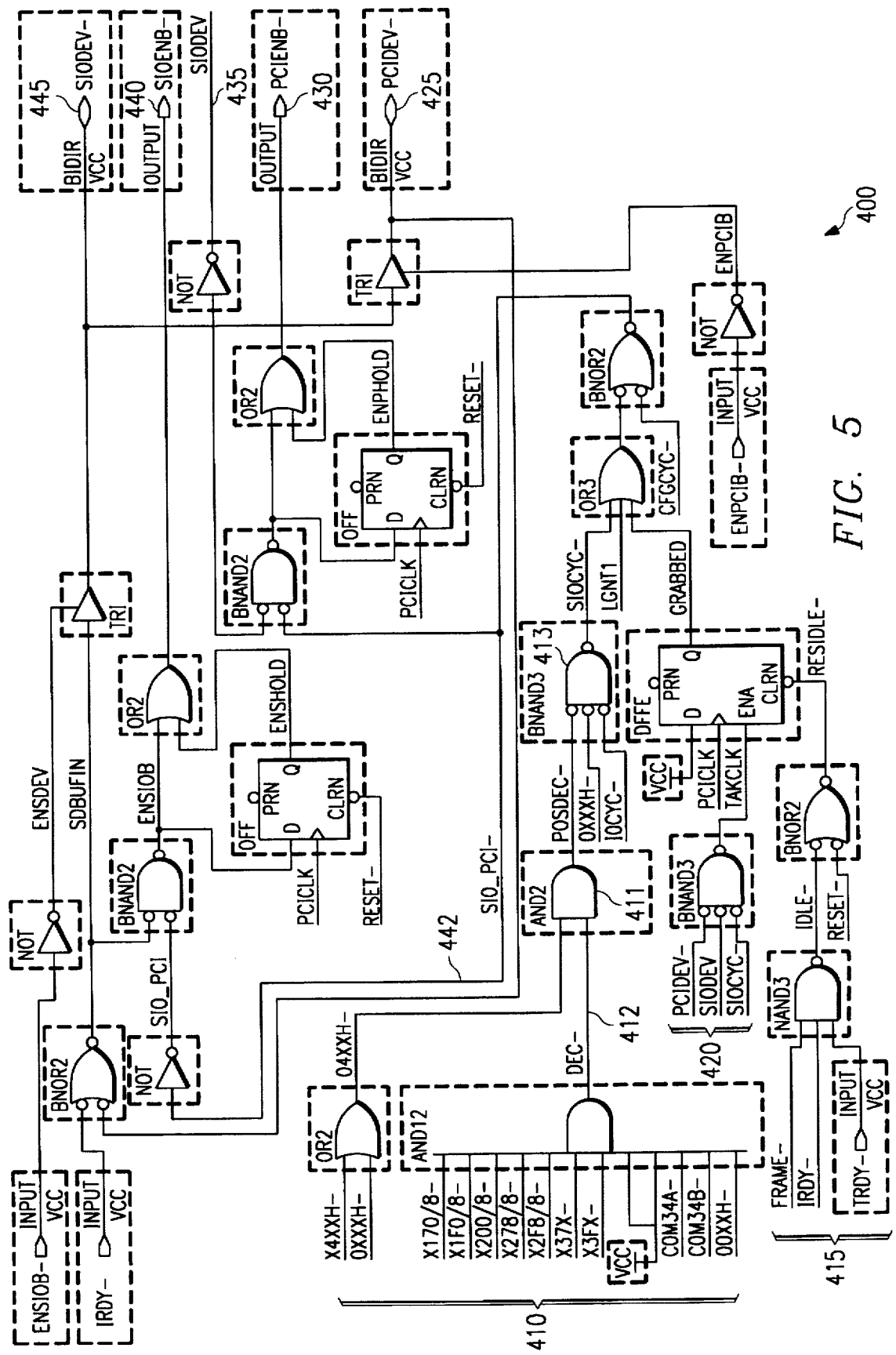
FIG. 5 is a schematic diagram of the device select drive circuit in accordance with the preferred embodiment of the invention.

In reference to FIG. 5, the device select drive circuit is shown and denoted generally as 400. Pass-through values 410 are inputs to gate 411 in the form of DEC- signal 412. DEC- signal 412 is active low whenever the subtractive decode agent 90 is allowed to grab the current cycle. The output of gate 411 (POSDEC-) forms an input into gate 413 and conjunctively combined with an input indicating the upper address values are 0' (corresponding to a non PCI address value) and a proper command type (in this case and I/O read or write). Thus, gate 413 is a command/function comparator which enables the subtractive decode agent 90 when predetermined values and commands are received on PCI bus 45. Line 442 (SID_PIC-) generates signal 440 SIDENB- as an output asserting the subtractive decode agent 90 device select line.

Figure 6:
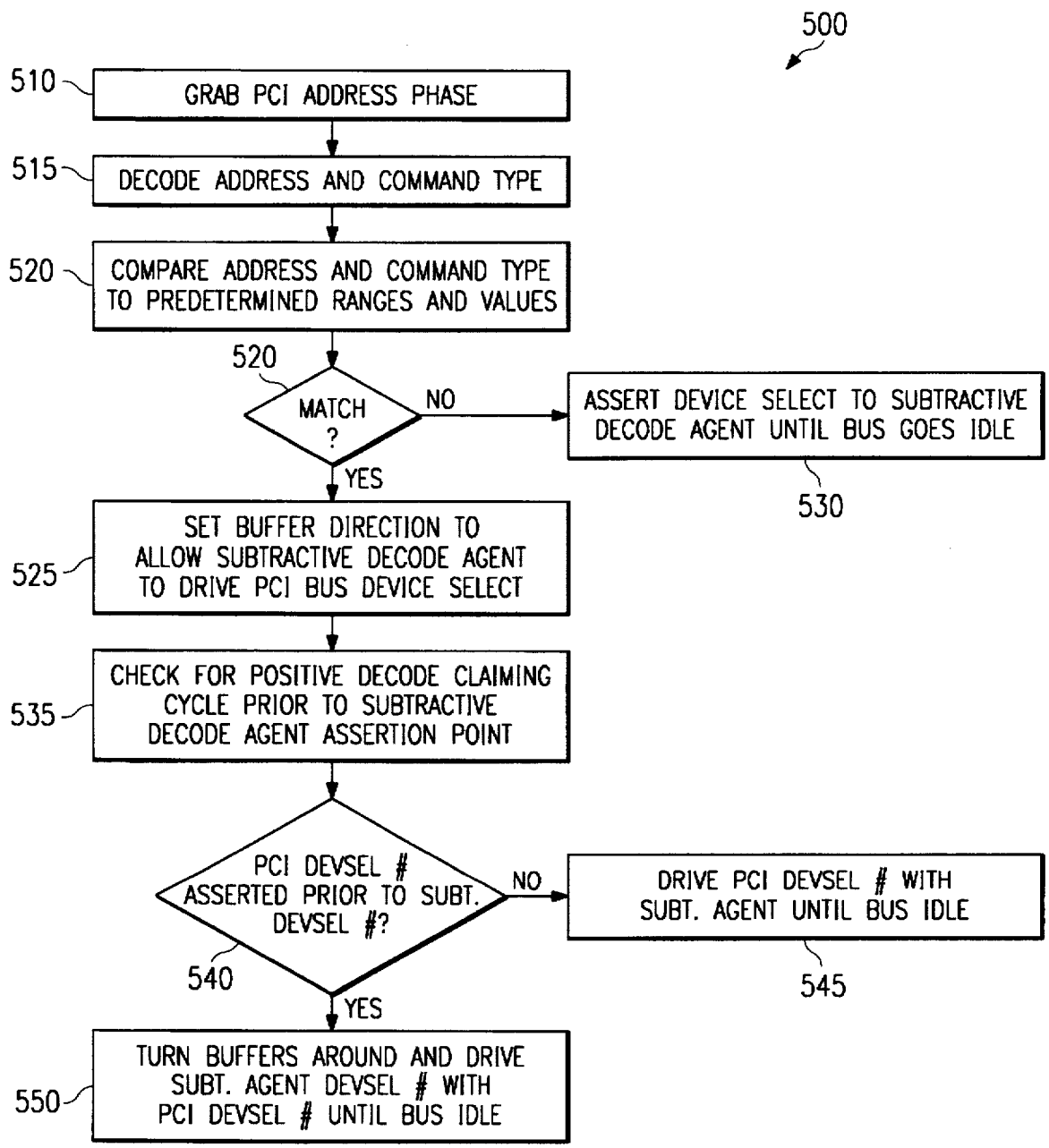
FIG. 6 is a flow diagram of the method used to convert subtractive device decode cycles to positive peripheral component interface device decode cycles in accordance with the preferred embodiment of the invention.

FIG. 6 illustrates the process, denoted generally as 500, to convert subtractive device decode cycles to positive PCI device decode cycles. Process flow starts during a PCI address phase when the control agent 92 grabs a PCI address cycle 510. Next, the control agent 92 decodes the device address and command type 515 and and compares them to predetermined address ranges and command types 520.

Where the current address value is within the predetermined address range and command types are a match (for example where the device corresponds to a pass-through device) 530, process flow is directed to setting the buffer direction to allow the subtractive decode agent 90 to drive the PCI bus 45 device select DEVSEL# line 525.

Next, the PCI bus 45 is checked 535 for positive decode agents that might claim the cycle prior to the subtractive decode agent 90 assertion point. Process flow continues to determining if the PCI bus 45 device select DEVSEL# is asserted prior to the subtractive decode agent 90, step 540. If so, the buffers are turned around and the subtractive device select DEVSEL# lines is driven with the PCI bus 45 device select DEVSEL# until the bus is idle, step 550. Otherwise, process flow continues to driving the PCI bus 45 device select DEVSEL# with the subtractive decode agent 92 until the bus is idle, step 545.

At step 520, however, if no match occurs then the control agent 92 asserts the device select DEVSEL# to the subtractive decode agent 90 until the PCI bus 45 is idle 530.

"Processor" or "microprocessor" in some contexts is used to mean that a microprocessor is being used on the portable system board but may also mean that a memory block (RAM, cache, DRAM, flash memory and the like) coprocessor subsystem and the like is being used. The usage herein is that terms can also be synonymous and refer to equivalent things. The phrase "circuitry" comprehends ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Words of inclusion are to be interpreted as nonexhaustive in considering the scope of the invention.

Internal and external connections, communications links circuit or signal pathways can be ohmic, capacitive, direct or indirect, via intervening circuits or otherwise. Implementation is contemplated in discrete components or fully integrated circuits in silicon, gallium arsenide, or other electronic material families, as well as in optical-based or other technology-based forms and embodiments. It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

I claim:

1. An apparatus for converting a first device decode cycle to a second device decode cycle comprising:
    a data communications bus, said data communications bus providing a signal pathway for said first device decode cycle and said second device decode cycle, and wherein said data communications bus supports a peripheral component interface (PCI) bus architecture;
    an interface to said data communications bus;
    a function decoder coupled to said interface, said function decoder arranged to select predetermined function types;
    a device decoder coupled to said interface operative to allow one of a number of devices to use subtractive decoding, said device decoder arranged to intercept said first device decode cycle from a plurality of devices on said data communications bus; and
    a device select drive circuit operatively coupled to said function decoder and said device decoder, said device select drive circuit arranged to generate said second device decode cycle on said data communications bus.

2. The apparatus as recited in claim 1 further including a positive decode cycle detection circuit operably coupled to said device select drive circuit.

3. The apparatus as recited in claim 2 further including a peripheral component interface system clock, said peripheral component interface system clock operatively coupled to said positive decode cycle detection circuit.

4. The apparatus as recited in claim 3 wherein said peripheral component interface system clock is operatively coupled to said function decoder, said device decoder and said device select drive circuit.

5. The apparatus as recited in claim 1 further including an address inverter having an input coupled to said interface and an output coupled to said device decoder.

6. The apparatus as recited in claim 3 wherein said interface is operably coupled to said peripheral component interface system clock.

7. The apparatus as recited in claim 1 wherein:
    said device decoder is configured to select a plurality of predetermined address values; and
    said function decoder is configured to select device read and write operations along said peripheral component interface.

8. An apparatus for converting a subtractive decode device cycle to a positive decode device cycle in a peripheral component interface bus having more than one device using subtractive decode bus cycles comprising:
    an interface to said peripheral component interface bus, said interface arranged as an agent for monitoring bidirectional data communications along said peripheral component interface bus;
    a device decoder communicably coupled to said interface operative to allow one of a number of devices to use subtractive decoding, said device decoder configured to pass a plurality of predetermined device address values;
    a function decoder communicably coupled to said interface, said function decoder configured to detect designated commands along said peripheral component interface bus;
    an address/function comparator operatively driven by said function decoder and said device decoder; and
    a positive decode signal generator operatively driven by said address/function comparator, said positive decode signal generator coupled to said peripheral component interface bus.

9. The apparatus as recited in claim 8 wherein said designated commands include bidirectional read and write signals on said peripheral component interface bus.

10. The apparatus as recited in claim 8 further including a positive device decode monitor, said positive device decode monitor operatively coupled to said positive decode signal generator.

11. The apparatus as recited in claim 8 further including a peripheral component interface system clock coupled to said device decoder and said function decoder.

12. The apparatus as recited in claim 11 wherein said peripheral component interface system clock is further coupled to said positive decode signal generator.

13. A method of converting a subtractive decode device agent to positive decode device agent comprising the steps of:
    taking a peripheral component interface address cycle off a peripheral component interface bus;
    decoding a current address from said peripheral component interface address cycle;
    comparing said current address to a plurality of preselected device addresses;
    determining whether said current address is within a range defined by said preselected device addresses; and
    asserting a directional positive device select signal to one of a number of devices on said peripheral component interface bus when said current address is within said range thereby allowing one of a number of said devices to use subtractive decoding.

14. The method as recited in claim 13 further including the steps of:

taking a command cycle from said peripheral component interface bus;

decoding said command cycle to obtain a command;

comparing said command to a plurality of predetermined command types;

determining whether said command is one of said predetermined command types; and asserting a directional positive device select signal on said peripheral component interface bus when said command is one of said predetermined command types.

15. The method as recited in claim 14 further including the steps of:

determining if said command and said current address are within a predetermined set of values; and asserting a directional positive device select signal on said peripheral component interface bus when said command and said current address are within said predetermined set of values.

16. The method as recited in claim 13 further including the steps of:

monitoring said peripheral component interface bus for a device select signal;

determining whether said device select signal was generated by a positive decode device; and lowering said directional positive device select signal on said peripheral component interface bus.

17. The method as recited in claim 13 further including the steps of:

storing said current address in a first internal memory area; and storing said command in a second internal memory area.

18. The method as recited in claim 13 further including the step of generating inverted address signal from said current address.

* * * * *